May 8, 1962 C. M. KRAMSKOY 3,033,456

APPARATUS FOR MULTIPLYING BINARY NUMBERS

Filed May 10, 1957 3 Sheets-Sheet 1

Inventor
C. M. Kramskoy
By Glascock Downing & Seebold
Attys

May 8, 1962 C. M. KRAMSKOY 3,033,456

APPARATUS FOR MULTIPLYING BINARY NUMBERS

Filed May 10, 1957 3 Sheets-Sheet 2

Inventor
C. M. Kramskoy
By Mascock Downing & Seebold
Attys.

Inventor
C. M. Kramskoy
By Glascock Downing & Seebold
Attys.

United States Patent Office 3,033,456
Patented May 8, 1962

3,033,456

APPARATUS FOR MULTIPLYING BINARY NUMBERS

Charles Mark Kramskoy, Ealing, London, England, assignor to Electric & Musical Industries Limited, Hayes, England, a company of Great Britain Filed May 10, 1957, Ser. No. 658,295
Claims priority, application Great Britain May 12, 1956
9 Claims. (Cl. 235—164)

Figure 1:
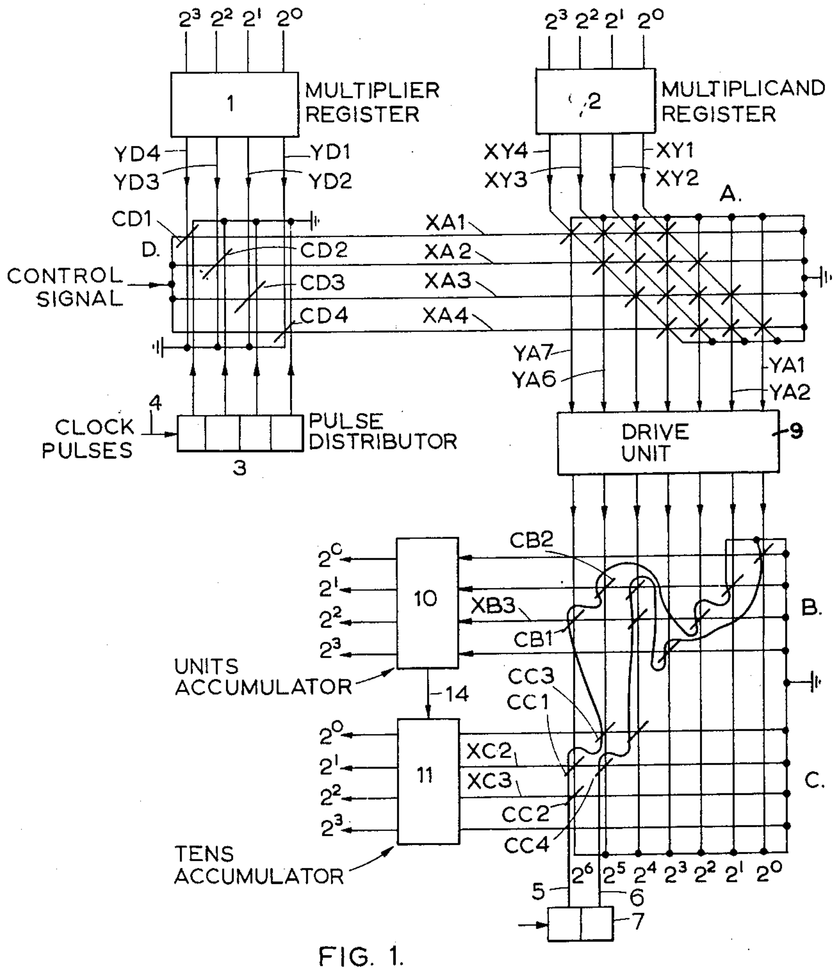

This invention relates to apparatus for multiplying binary numbers.

In data handling apparatus and in binary digital computers, the need for multiplying two numbers frequently arises. Apparatus for multiplying two numbers in normal binary code are known, but in data handling apparatus for commercial use especially, it is often desirable to express numbers in binary-decimal code or in some other code in which different groups of binary digits represent different characters in a higher than binary scale. It is, of course, possible to transform a number from a binary-decimal code or some similar code into a serial binary code before multiplication and to re-transform the final product after multiplication. Such procedure tends, however, to be wasteful of time and of components.

The object of the present invention is to provide improved multiplying apparatus which is especially adapted for multiplying numbers in a binary-decimal or other similar code, with a view to effecting conversions as elementary steps in the multiplication process.

According to the present invention there is provided apparatus for multiplying one group of binary digits by another group of binary digits comprising means for producing a plurality of binary code signals representing partial products of said one group of binary digits with individual digits of the other group of binary digits, means for converting the signal elements representing individual binary digits in each partial product into character signals, each character signal comprising signal elements representing a group of binary digits constituting a character in a higher than binary scale, and means for summing the corresponding character signals of the partial products.

The expression "character" is used herein and in the claims to denote a digit of a number expressed in a higher than binary scale, the expression "digit" having been used always to refer to binary digits. The expression "group" in relation to binary digits has been used herein and in the claims to denote a series of digits of successively higher order. Moreover the expression "binary code signal" is used herein and in the claims to denote a signal comprising different signal elements representing individual binary digits, such digits being arranged in some predetermined manner but not necessarily in such a way that successive signal elements represent digits of successively higher order. The expression "signal element" is used herein and in the claims to denote the component of a signal representing a single binary digit. Therefore when a number in a higher than binary scale is expressed in "binary code," a "group" of binary digits is required to express each "character" in the number, as for example, when a decimal number is expressed in so called "binary decimal code" when each group of binary digits comprises binary digits of order $2^0$, $2^1$, $2^2$ and $2^3$.

If the multiplicand and the multiplier are expressed by means of groups of binary digits with each group representing a character in a higher than binary scale, the apparatus preferably comprises a plurality of elementary multiplying apparatuses as defined in the preceding paragraph, one for each group in the multiplicand, each elementary multiplying apparatus having means for selectively gating the respective group of multiplicand digits to the converting means in response to individual digits of the multiplier, thereby to form partial products.

Figure 2:
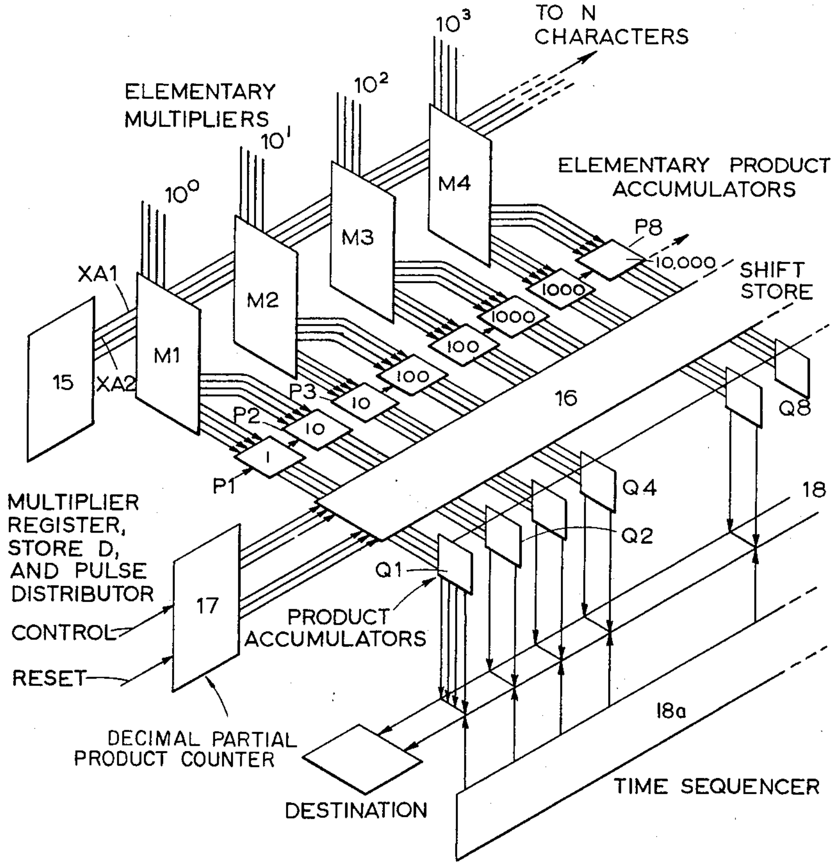
Figure 3:
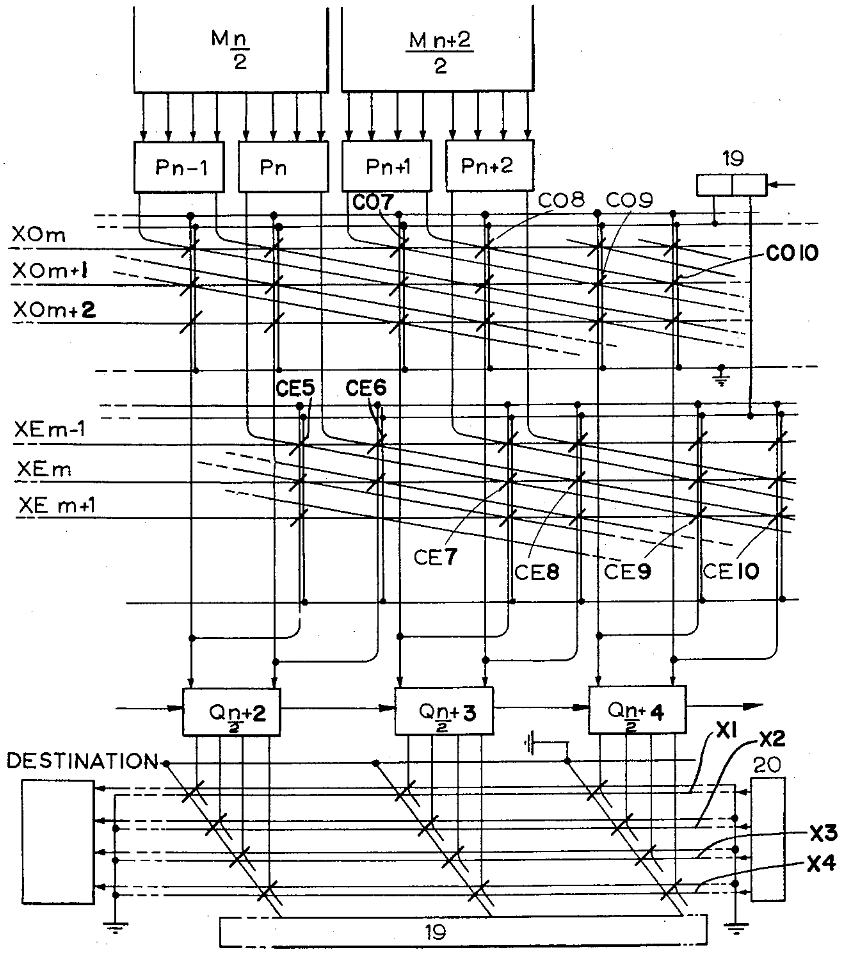

In order that the invention may be clearly understood and readily carried into effect, the invention will be described with reference to the accompanying drawings, in which:

FIGURE 1 illustrates an elementary multiplier according to the present invention for multiplying two single character decimal numbers, each number being coded in binary code, FIGURE 2 illustrates diagrammatically apparatus for multiplying in series-parallel mode two decimal numbers each having a plurality of characters, say N and, FIGURE 3 illustrates in greater detail part of the apparatus shown in FIGURE 2.

For simplicity of illustration, the apparatus has been shown diagrammatically in the drawing and short diagonal lines are used throughout to represent magnetisable cores of toroidal form. Some such cores are denoted by references C and suffixes are employed where necessary to distinguish particular cores. The cores are in general arranged in matrices and the cores in any one matrix, for example to the matrix A of FIGURE 1, are laced by two sets of conductors which are usually referred to as column and row conductors respectively. Row conductors are denoted throughout by the reference X, with suitable suffixes as required, whereas column conductors are denoted throughout by reference Y, again with suitable suffixes as required. In some of the matrices the cores are, in addition, laced by so called diagonal conductors and these conductors are denoted throughout by the references XY. The expression "diagonal" does not of course necessarily imply that the conductors are diagonal in space but merely that they pass in a systematic manner through cores at the intersections of row and column conductors.

Binary digital signal elements are stored in the cores in well known manner by using the property of remanence magnetism, remanence magnetism of one polarity representing a binary digit of value "1" and remanence magnetism of opposite polarity representing a binary digit of value "0." The conductors by which the cores are laced are employed for recording binary signal elements in the cores or reading such information from the cores. Recordings of information in particular cores can be effected by applying current pulses of appropriate polarity and of predetermined amplitude (so-called "1" currents) to a single conductor passing through that core or alternatively by simultaneously applying current pulses of appropriate polarity and of half the predetermined amplitude (so-called "½" currents) to two conductors passing through the particular cores. Such currents change the cores to a combination of magnetisation states corresponding to the data represented by the applied currents. Reading of a recorded signal element is usually effected by applying "1" currents with a sense tending to restore the respective cores to the "0" condition, any corresponding magnetisation changes inducing current pulses in other conductors which are laced through the respective cores. The actual technique of reading or writing adopted in particular cases will be apparent in the following description. Although the conductors are represented in the drawing as single lines it will be understood that the conductors are arranged, by suitable earth returns, to form complete loops for the flow of currents to and from the cores.

Referring to FIGURE 1, the elementary multiplier shown therein comprises a multiplier register 1 and a multiplicand register 2. A single character decimal number, which is to form the multiplicand, is applied to the register 2 in binary code and the register 2 may comprise four two state devices which store signal elements representing the four binary digits used to represent the number. The multiplier register 1 may be of similar construction, and as such registers are well known, the registers 1 and 2 have been represented merely by means of rectangles. The multiplier register 1 has four output conductors YD1 to YD4 which constitute the Y conductors of a store D consisting of four cores CD1 to CD4, through which cores pass also the output conductors of a four stage pulse distributor 3. The pulse distributor is driven by clock pulses applied by way of the input lead 4. Furthermore, four row conductors XA1 to XA4 of a matrix store A, termed the partial product store, are passed respectively through the core CD1 to CD4. The register 2 has four output conductors which form diagonal conductors XY1 to XY4 of the matrix store A. The store A comprises four rows of cores with each row (but the first) displaced one position to the right with reference to the preceding row, such a displacement representing a shift of one binary digital place. The cores of the store A are also laced by column conductors Y, which are employed for reading signal elements recorded on the cores and it will become apparent in the following that a "1" signal element transmitted by the column conductor YA1 corresponds to $2^0$, a "1" signal element transmitted by YA2 corresponds to $2^1$, and so on to YA7 which corresponds to $2^6$.

Signal elements read from the matrix A by means of the column conductors are transferred to a pulse regenerator or a so-called drive unit 9 which relays the signal elements to two binary to binary-decimal conversion stores B and C. The unit 9 is shown merely as a rectangle, since it may be of any suitable construction, its main function being to "clean-up" or regenerate the pulses from the signals read from the matrix A. In the stores B and C magnetic cores are placed only at the intersection of selected X and Y conductors. Signals relayed by the unit 9 at particular times may include signal elements representing binary digits up to the seventh order and the cores of the stores B and C set up, in a binary code, the corresponding units and tens decimal digits. In the case of the stores B and C, the X conductors are employed for reading recorded signals and signals so read are applied to accumulators 10 and 11, the "units" and "tens" accumulators, respectively. These accumulators may be of any suitable construction and form no part of the present invention, and it is to be understood that provision is made for a carry from the accumulator 10 to the accumulator 11, this provision being represented in the drawing by the connection 14. In order to drive the cores in the stores B and C the output conductors 5 and 6 of a two stage pulse distributor 7 are laced selectively through the cores in the stores B and C. It will be noted that some of the row wires of these two stores have two or more cores on them and if two such cores are within four adjacent columns they may be set in the "1" state simultaneously when a partial product is read from the store A. Therefore they must be read sequentially to avoid errors in the accumulator 10 and 11 and the lacing of the conductors 5 and 6 is selected so that neither conductor passes through two cores in the same row which are within four columns, only two conductors being required (and thus only two stages in the distributor 7) since there are never more than 2 cores within four adjacent columns in any row of the cores B and C. Subject to this limitation, the lacing of the conductors 5 and 6 may be arbitrary.

In operation of the elementary multiplier shown in FIGURE 1, initially the cores of the stores A, B and C are all in state "0." The multiplier is set up in the register 1 and the multiplicand is set up in the register 2. At an appropriate time, registers 1 and 2 are read simultaneously, to apply "½" currents selectively to the column conductors of the store D and to the diagonal conductors of the store A, a "½" current being applied to a conductor only if the multiplier, or the multiplicand as the case may be, has "1" in the respective digital place. Simultaneously with the reading of the registers 1 and 2 a "½" current pulse is applied to all the row conductors XA1 to XA4 and this causes the multiplier to be set up in the cores CD1 to CD4, and by the same process the multiplicand is set up in the store A in each of the four rows thereof with a shift of 1 binary place from one row to the next. The number of "shifts" corresponds to the number of digits in the multiplier. The multiplier and the multiplicand are both spacially arranged so that the order of the binary digit decreases from left to right as seen in the drawing. The pulse distributor 3 is then operated to feed driving pulses successively, in synchronism with the clock, to the cores CD1 to CD4 and these pulses reset the cores which are in "1" state, thereby applying the multiplier digits in correct sequence to the row conductor XA1 to XA4 of the store A. It is of course necessary to ensure that the pulses which represent the multiplier digits have the correct polarity to reset cores of the store A. In effect, the first pulse from the distributor 3 gates the highest order digit of the multiplier to the conductor XA1. The contents of row 1 of the register A are therefore transferred to the drive unit 9 and thence to the cores B and C, such content being the highest partial product. Assume that the highest order binary digit of the multiplier has value "1" and therefore represents $2^3$, namely 8. If the highest order multiplicand digit is also "1" the product of these two digits is 64. The output on the vertical conductor YA7 as relayed by the drive unit 9 sets up a "1" in each of the cores CB1, CC1 and CC2 of the stores B and C. Core CB1 is laced by the third row conductor XB3 of the store B and represents $2^2$ namely 4. Similarly cores CC1 and CC2 of the store C are laced by the second and third row conductors XC2 and XC3 and represent $2^1+2^2=6$. Therefore the required decimal digits 6 and 4 are set up automatically. A similar result is produced with the output from each other core in the first row of the matrix A. After the stores B and C have received the first partial product signals are applied to the conductors 5 and 6 by actuation of the pulse distributor 7 to transfer the partial product from the cores B and C to the accumulators 10 and 11.

The second pulse from the distributor 3 is applied to the core CD2 and if the second highest digit in the multiplier is 1, it initiates a transfer of the second partial product (that is the multiplicand, shifted one place to the right) to the drive unit 9 and thence to the cores B and C. Assuming the second highest digit of the multiplier is 1, representing 4, there will be an output in the column conductor YA6 representing $2^5$, namely 32, and this sets up "1" in the core CB2 of store B and also sets up "1" in the cores CC3 and CC4 of core C. The core CB2 by its location represents $2 \times 10^0$ and cores CC3 and CC4 represent $1 \times 10^1$ and $2 \times 10^1$ respectively, and when in due course signals are transferred from the cores B and C to the accumulators 10 and 11 the decimal number 32 is transferred as required. Each other digit of the partial product is dealt with in a similar way.

By the same procedure the third and fourth digits of the multiplier are gated respectively to the row conductors XA3 and XA4 of the store A, to transfer the multiplicand with appropriate "shifts" to the cores B and C where they are converted into binary decimal code and in due course transferred to the accumulators 10 and 11. It is necessary to arrange that the accumulators are in a quiescent state after each entry before a subsequent entry is made.

The various steps in the multiplication process described can be timed automatically by means of a control organ, but as this technique is well known to those skilled in the art, it has been deemed unnecessary to illustrate the control organ.

Summarising the operation of FIGURE 1, it will be appreciated that there are produced in the column conductors YA1 to YA7 successive binary code signals representing partial products of the multiplicand with individual digits of the multiplier. Thus the binary digits which express the multiplicand are applied to the matrix store A in the parallel mode whereas the binary digits which express the multiplier are applied in the series mode. Each binary code signal constituting a partial product is applied, via the drive unit 9, to the two binary-to-decimal conversion stores B and C. The signal elements representing individual binary digits in each partial product are converted into character signals, such character signals being set up in the cores CB and CC. Each character signal comprises signal elements representing a group of binary digits constituting a character in the decimal scale. Furthermore the accumulators 10 and 11 in the conjunction with the pulse distributor 7 constitutes means for summing the corresponding character signals of the successive partial products.

In some cases, instead of reading the stores B and C in two steps, by means of the distributor 7, reading may be effected in a single step, in which case the input to the accumulators 10 and 11 on some conductors may have any one of three values, namely 0, 1 and 2. Consequently in such a case the accumulators 10 and 11 require to be constructed to discriminate among these different values.

The N character multiplier shown in FIGURE 2 employs a series of elementary multipliers similar to that shown in FIGURE 1 although for simplicity only four are shown, and these are denoted by references M1 to M4. The elementary multipliers are referred to as multiplier planes and decimal digits are as stated referred to as characters. The multiplicand for the plane M1 is the lowest order character (units decimal digit) similarly the planes M2, M3 and M4 . . . receive inputs corresponding to the tens, hundreds, thousands characters . . . . The block 15 comprises a multiplier register, store and pulse distributor similar to the elements 1, D and 3 of FIGURE 1. However in this case provision is made for feeding the binary digits of all multiplier characters in time serial order to the planes M1, M2 . . . . Firstly, the four binary elements of the highest order character are applied successively to the row wires XA1, XA2, etc. as in FIGURE 1. Secondly the binary elements of the second highest order character are dealt with in the same way, and so on through all the multiplier characters. Therefore the multiplier register 1 must have capacity for all the multiplier characters, and switching means for feeding the binary digits of the characters in sequence to the cores CD1 to CD2. The output of the planes M1 to M4 are accumulated in a series of accumulators (like 10 and 11), two for each elementary multiplier. The orders of the accumulators are indicated in the drawings and the accumulators are denoted by the references P1, P2 . . . P8 . . . . The block 16 represents a shift store for the decimal partial products set up by multiplying the several characters of the multiplicand by each character of the multiplier. The decimal partial product shift store 16 is controlled by a decimal partial product counter 17 which advances one step for each multiplying operation involving a multiplier character. The expression "decimal partial product" is used to denote the partial product of all decimal characters of the multiplicand with a single character of the multiplier and is to be distinguished from the expression "partial product" used in relation to FIGURE 1 to denote the product of a group of binary digits by an individual binary digit. The construction of the shift register 16 is illustrated in greater detail in FIGURE 3 and it is such as to produce successive shifts of the partial products corresponding to the order of the successive multiplier digits. The characters of each partial product, thus shifted, are fed to another series of accumulators Q1, Q2 . . . Q8 . . . which perform the addition of the different characters of successive partial products, after these partial products have been shifted or weighted to become in combination a decimal partial product. Thus, the accumulator Q1 accumulates the unit characters in successive decimal partial products, the accumulator Q2 accumulates the tens characters and so on. There is no one-for-one correspondence between the accumulators P and the accumulators Q because, whereas the number of accumulators P is determined by the number of characters in the multiplicand, being in fact twice that number of characters, the number of accumulators Q is determined by the number of characters in the multiplicand and the number of characters in the multiplier, being the sum of these two numbers of characters. After the multiplying operation is completed, the product is therefore to be found in the accumulators Q1, Q2 . . . Q8 . . . with the characters in parallel form and the reference 18 indicates symbolically a magnetic core matrix for converting the product to serial form as far as the decimal characters are concerned. External couplings are provided between the pairs of accumulators in the series P1, P2 . . . to allow for digit carrying as between the accumulators 10 and 11 in FIGURE 1. Moreover the accumulators Q1, Q2 . . . are connected in a continuous sequence to allow for digit carrying operations, in known manner.

In FIGURE 3, the blocks $Pn-1$, $Pn$, $Pn+1$ and $Pn+2$ represent four of the accumulators in the series P1, P2 . . . ($n$ being assumed to be even). The accumulators $Pn-1$ and $Pn$ comprise the two accumulators for the plane $$\frac{Mn}{2}$$

whereas the accumulators $Pn+1$ and $Pn+2$ are the two accumulators for the plane $$\frac{Mn+2}{2}$$

Let it be assumed that $n$ is six. The plane $$\frac{Mn}{2}$$

is then that in which operations are performed on the hundreds character of the multiplicand. Let it also be assumed that multiplication by the hundreds character in the multiplier has just been completed. The accumulator $Pn-1$ may then contain a ten-thousands ($10^4$) character, and the accumulator $Pn$ may contain a hundred-thousands ($10^5$) character. Moreover the accumulator $Pn+1$ may also contain a hundred-thousands ($10^5$) character whereas the accumulator $Pn+2$ may contain a millions character ($10^6$). This shows that after any partial multiplying operations, characters accumulated in the accumulator $Pn$ and $Pn+1$ must be transferred to the same Q accumulator, namely Q6 in the example assumed. The three Q accumulators shown in FIGURE 3 are denoted by the references $$Q_{\frac{n}{2}+2},\ Q_{\frac{n}{2}+3}$$

and $$Q_{\frac{n}{2}+4}$$

to indicate that there is no one-for-one correspondence between the order of the characters stored in the Q accumulators shown and that of the characters stored in the P accumulators shown. Moreover if other values of $n$ and/or other multiplier characters are considered, the generality of this result will be apparent. Therefore the full construction of the shift store 16 is adequately illustrated by means of the representative section illustrated in FIGURE 3. In the store 16 there are two sections, each having as many rows of cores as there are decimal partial products to be dealt with, but only three rows are shown in each section and these are identified by their row conductors respectively. Thus, the row conductors $XOm$, $XOm+1$ and $XOm+2$ are shown in one section, which corresponds to the odd numbered accumulators say P$n-1$ and P$n+1$ etc. (taking $n$ as even), and row conductors XE$m-1$, XE$m$ and XE$m+1$ are shown in the other section, which corresponds to the even numbered accumulators, P$n$, P$n+2$ etc. Each row includes four magnetic cores for each accumulator such as P$n$. Output conductors from the accumulators are also laced through these cores but in a diagonal fashion as represented in FIGURE 3. In FIGURE 3 only two output conductors and only two cores are shown in each row of the shift store 16 corresponding to each accumulator, to simplify the illustration, and it will be observed that the inclination of the diagonal conductors is such that the group of cores corresponding to any one accumulator, say P$n-1$, is shifted by one character "distance" from one row to the next. Some of the cores corresponding to the accumulator P$n+1$ are denoted in FIGURE 3 by the reference CO7, CO8, CO9 and CO10. Similarly, some of the cores corresponding to the accumulator P$n$ are denoted by the references CE5 to CE10, the cores CE7 to CE10 having the same digital significance as the cores CO7 to CO10 in the other section of the store 16. There is a similar relationship between other cores in the store 16. To transfer the elementary partial products from the accumulators P to the store 16, the decimal partial product counter 17 (FIGURE 2) applies a current pulse to and only to the respective one row conductor in each section of the store 16 after each decimal partial product is formed. Assume once more that $n$ is six and multiplication by the hundreds character of the multiplier has just been completed. The characters accumulated in P$n$ and P$n+1$ have both to be transferred to the accumulator $$Q_{\frac{n}{2}+3}$$

The decimal partial product counter is therefore required to deliver "½" current pulses to the row conductor XO$m$ and to the row conductor XE$m$. These current pulses may be simultaneous, and during their occurrence corresponding half currents are applied selectively to the output diagonal conductors of the accumulators P, depending on the values of the characters accumulated therein. The elementary partial products are thereby transferred to cores in the store 16 and the "shift" produced by the row selection of the counter 17 is such that the characters of the partial products have the required weights. Similar considerations apply to all the other elementary partial products accumulated in the accumulators P and after each transfer to a pair of rows of the shift store 16, the elementary partial products suitably weighted so that in combination they form a decimal partial product are fed into the product accumulators Q by applying suitable currents to the column conductors of the shift store 16. This is achieved by a two stage pulse distributor 19 like the distributor 7, which applies a reading pulse sequentially to column conductors in the two sections of the store 16. Since the characters of the multiplier are taken in decreasing order the counter 17 is required to count down, for example, when multiplication by the hundreds character has been completed, the decimal partial product has been transferred to the Q accumulators and all carrying processes have ended, the tens character of the multiplier is used to gate the multiplicand characters selectively into the accumulators P. The counter then applies a "½" current pulse to the conductors XO$m-1$ and XE$m-1$ to initiate a transfer of the elementary partial products to the rows XO$m-1$ and XE$m-1$ for the purpose of weighting them before they are finally transferred to the accumulators Q as decimal partial products.

The transfer of the final product from the accumulators Q1, Q2 . . . to the conversion store 18 is achieved as follows. Each accumulator Q produces "½" currents on its four column conductors in dependence on the value of the binary elements of the respective decimal digit.

These "½" currents combine with "½" currents fed to row wires X1, X2, X3 and X4 from a control device 20 of the conversion store 18 (FIGURE 3) to record binary elements in different rows of the matrix 18, corresponding binary elements from different accumulators being stored in the same rows. Consequently each column of four cores in the matrix 18 corresponds to a single decimal character. For reading the character the time sequencer 18$a$ is arranged in any suitable manner to apply read out currents in serial order to the columns. This causes the successive characters to be read out in time serial order. The time sequencer may be a simple counter, synchronised by clock pulses. The device 20 may be a simple gate.

What I claim is:

1. Apparatus for multiplying one group of binary digits by another group of binary digits comprising means for producing a plurality of binary code signals representing partial products of said one group of binary digits with individual digits of the other group of binary digits, converting means for converting the signal elements representing individual binary digits in each partial product into character signals, each character signal comprising signal elements representing a group of binary digits constituting a character in a higher than binary scale, and means for summing the corresponding character signals of the partial products.

2. Apparatus for multiplying numbers expressed in groups of binary digits with each group representing a character in a higher than binary scale, comprising means for producing a plurality of binary code signals representing partial products of each group of binary digits in the multiplicand with individual digits in each group of binary digits in the multiplier before taking account of the order of the multiplier characters represented by the respective groups of binary digits, converting means for converting the signal elements representing individual binary digits in each partial product into character signals, each character signal comprising signal elements representing a group of binary digits constituting a character in a higher than binary scale, means for summing the corresponding character signals derived from said converting means to form a plurality of elementary product signals each representing the product of a group of binary digits in the multiplicand with a group of binary digits in the multiplier, means for weighting said elementary product signals to take account of the order of the multiplier characters represented by the respective groups of binary digits, and means for summing the weighted elementary product signals to produce a signal representing the product of said numbers.

3. Apparatus according to claim 1, said converting means comprising a plurality of conductors grouped to represent the respective groups of binary digits, and means for injecting signals into selected conductors in said groups in response to the signal elements in the partial products.

4. Apparatus according to claim 3 wherein said means for injecting signals into selected conductors comprises magnetic core means representing the individual binary digits and coupled with the selected conductors, and means for inducing predetermined magnetization changes in the respective core means in response to signal elements representing binary digits of value "1."

5. Apparatus according to claim 4 wherein said core means representing some individual binary digits comprises a plurality of cores linked with different conductors.

6. Apparatus according to claim 1 wherein said means for producing a plurality of binary code signals representing partial products comprises a plurality of column conductors, one for each binary digit in the partial products, means for gating signals representing binary digits of value "1" in the multiplicand to groups of said column conductors selectively in response to the individual digits of the multiplier, said gating means being such that the locations of the groups of column conductors represent the order of the respective multiplier digits.

7. Apparatus according to claim 6 wherein said gating means comprises magnetic cores at the intersections of said column conductors and of row conductors, which correspond to digits of the multiplier, means for inducing sequential signal elements in said row conductors representing respectively the binary digits of the multiplier, diagonal conductors passing selectively through said cores at said intersections and means for inducing simultaneous signal elements in diagonal conductors representing respectively the binary digits of the multiplicand, thereby to gate said last mentioned signals to groups of the column conductors.

8. Apparatus for multiplying numbers expressed in groups of binary signals with each group representing a character in higher than binary scale, comprising a plurality of elementary multipliers, one elementary multiplier for each multiplicand character; each elementary multiplier comprising a plurality of column channels, one for each possible binary digit in the output of the respective elementary multiplier, a group of input channels for a signal representing the respective multiplicand character in binary code, a plurality of groups of gates, one group of gates for each possible digit required to express a multiplier character in binary code, said groups of gates being operative to connect said input channels respectively to different groups of said column channels to effect successive column shifts of said input channels, means for selectively operating said groups of gates in succession according to signal elements representing individual binary digits of a multiplier character to induce signals in said column channels representing the product of said multiplier and multiplicand characters; said gate operating means being common to said plurality of elementary multipliers to operate simultaneously corresponding groups of gates in the different elementary multipliers; means for accumulating signals induced in the output channels of said elementary multipliers, said accumulating means including means for differently weighting the respective signals to accord with multiplier characters of different orders, means for converting individual signal elements in the column channels of said elementary multipliers into character signals, each character signals comprising a group of binary signals representing a character in higher than binary scale, said accumulator means including means for separately summing the character signals derived from each elementary multiplier, means for weighting the separately summed signals to accord with multiplier characters of different orders, and further means for summing the weighted signals including a distributor to render said further means responsive at separate times to character signals of the same order derived from different elementary multipliers.

9. Apparatus according to claim 8, wherein said weighting means comprises a plurality of groups of column conductors, there being one group of column conductors for every character signal output of said first summing means, and there being in each group one conductor for each binary signal required to express the corresponding character; two series of row conductors, there being one row conductor in each series for each multiplier character order; a plurality of magnetic cores disposed respectively at the junctions of said column and row conductors so as to be coupled with said conductors; a plurality of groups of diagonal conductors, there being one group of diagonal conductors for every character signal output of said first summing means and there being in each group one conductor for each binary signal required to express the corresponding character; alternate groups of diagonal conductors being laced through the magnetic cores at the junction of the column conductors and the row conductors in one of said series to effect successive column shifts of the respective groups of diagonal conductors; intervening groups of said diagonal conductors being laced through the magnetic cores at the junction of the column conductors and the row conductors of the other of said series to effect successive column shifts of the respective groups of diagonal conductors; means for successively pulsing the row conductors of both series to transfer character signals from said first summing means, via said diagonal conductors to the magnetic cores coupled with the respective row conductors, thereby to weight the respective character signals according to the multiplier character order; and said distributor comprising means for alternately pulsing the magnetic cores coupled with said two series of row conductors to transfer respective character signals at different times to said further summing means.

References Cited in the file of this patent

UNITED STATES PATENTS

| | | |
|---|---|---|
| 2,394,924 | Luhn | Feb. 12, 1946 |
| 2,428,812 | Rajchman | Oct. 14, 1947 |
| 2,604,262 | Phelps | July 22, 1952 |
| 2,722,375 | Chenus | Nov. 1, 1955 |
| 2,734,182 | Rajchman | Feb. 7, 1956 |
| 2,808,986 | Stone et al. | Oct. 8, 1957 |
| 2,846,671 | Yetter | Aug. 5, 1958 |
| 2,907,526 | Havens | Oct. 6, 1959 |

FOREIGN PATENTS

| | | |
|---|---|---|
| 1,101,201 | France | Apr. 20, 1955 |

OTHER REFERENCES

Richards: "Arithmetic Operations In Digital Computers," D. Van Nostrand Co., Inc., 1955, pp. 247–250.

"Synthesis of Electronic Computing and Control Circuits," Harvard University Press, 1951, pp. 198–200.

"Description of a Magnetic Drum Calculator," Harvard University Press, 1952, pp. 101–114.